United States Patent Office 3,790,450
Patented Feb. 5, 1974

3,790,450
ORGANIC COATING PROCESS
Herman S. Bloch, Des Plaines, and James J. Louvar, Niles, Ill., assignors to Universal Oil Products Company, Des Plaines, Ill.
No Drawing. Filed Dec. 21, 1972, Ser. No. 317,327
Int. Cl. C23b 5/00, 9/00
U.S. Cl. 204—14 N                    10 Claims

ABSTRACT OF THE DISCLOSURE

An electrochemical method of depositing a high-melting, impervious organic coating upon a metal substrate utilizing a novel electrolyte comprising a lower aliphatic acid, an aromatic compound and a Group III–A halide.

---

This invention relates to an electrochemical method of depositing an organic coating upon a metal substrate. More specifically, this invention pertains to an electrochemical method of depositing a high-melting, impervious organic coating upon a metal substrate utilizing a novel electrolyte.

It has been shown in the prior art that electrochemical plating or electrocoating has been performed in various types of electrochemical cells where the electrically conductive objects are passed through an aqueous coating bath in which organic materials are dispersed and a direct current flow of electrical energy is maintained by a differentiation of electrical potential between the negative cathode and the positive anode. The organic coating materials that have been utilized were alkyd, acrylate, phenol-formaldehyde and/or carboxylic acid resins accompanied by an organic monomer or polymer of ethylene glycols, glycerols, monohydric alcohols, carboxylic acids, ethers, aldehydes or ketones.

In contradistinction to the prior art, the present invention is concerned with a method of depositing a high-melting impervious organic coating upon a metal substrate utilizing a non-aqueous electrolyte comprising a lower aliphatic acid, an aromatic compound and a Group III–A halide. The utilization of this novel electrolyte in the method of electrocoating a metal substrate results in a less expensive method of preparing the desired organic coated metal as a consequence of eliminating any need for resin mixtures and the corresponding selection of the proper organic monomer and/or polymer. By eliminating the aforesaid use of the resins and the necessity of a proper corresponding organic monomer or polymer, this invention will permit a simpler and more commercially feasible process in the art of electrocoating.

The desired products of this invention, namely, the high-melting, impervious organic coated metal substrate may be utilized in the aerospace, automobile, or any other industry that requires a metal substrate to have such a type of a coating deposited thereon. Some specific examples of the ways in which this electrocoating method may be utilized reside in the coating of nose-cones for aerospace vehicles which will afford protection during departure and re-entry through the atmosphere and the coating of automobile frames and bodies to inhibit deterioration from natural and man-made elements.

It is therefore an object of this invention to provide an electrolyte which will effectuate a coating upon a metallic substrate.

A further object of this invention is to provide a method for preparation of a high-melting impervious organic coating upon a metal substrate utilizing a novel electrolyte.

In one aspect an embodiment of this invention resides in the method for electrochemically coating a metal substrate utilized as the positive electrode of an electrochemical cell in which a direct current flow of electrical energy is maintained throughout the electrolyte, passing from the cathode to the anode, where a difference of electrical potential of the first electrode to that of the second electrode is provided to insure a direct current flow of electrical energy for a predetermined period of time sufficient to form a high-melting, impervious organic coating on said metal substrate by utilizing as an electrolyte a lower aliphatic acid, an aromatic compound and a Group III–A halide.

A specific embodiment of this invention resides in electrocoating a platinum substrate using an electrochemical cell, where a differentiation in electrical potential is maintained between the cathode and anode to insure a direct current flow of electrical energy, in the presence of an electrolyte comprising acetic acid, benzene and boron fluoride at a temperature of 20° C. and at atmospheric pressure.

Another specific embodiment of this invention resides in electrocoating a silver substrate using an electrochemical cell, where a differentiation in the electrical potential is maintained to insure a direct current flow of electrical energy, in the presence of an electrolyte comprising propionic acid, toluene and boron fluoride.

Other objects and embodiments will be found in the following further detailed description of the present invention.

As hereinbefore set forth the present invention is concerned with a method for electrocoating a metallic substrate utilizing a novel electrolyte comprising a lower aliphatic acid, an aromatic compound and a Group III–A halide. The electrocoating is effected under conditions which include a temperature in the range of from about 0° C. to about 125° C. and preferably in a range of from about 10° C. to about 50° C. In addition another reaction condition involves pressures, said pressures ranging from about one atmosphere to 5 atmospheres and preferably in a range of from about one atmosphere or about two atmospheres. When super-atmospheric pressures are employed, said pressure may be afforded by the introduction of a substantially inert gas such as nitrogen, helium, or argon into the electrochemical cell, the particular pressure which is used being that which is necessary to maintain the electrolytes in a liquid phase; or it may be the autogenic pressure of the reaction mixture at the reaction temperature. Another variable condition which is employed to effect the process of the present invention is the period of electrolysis time necessary to effectuate the electrocoating of the metal substrate. The time required to effect the electrocoating is dependent upon the thickness of coating desired and the direct current that is passed through the electrochemical cell. The requisite time necessary to effect the coating will usually range from about 0.1 hour to about 15 hours in order to obtain the preferred thickness when using an initial electromotive force of 3.6 volts.

The novel electrolyte utilized comprises a lower aliphatic acid, an aromatic compound and a Group III–A halide. Examples of suitable lower aliphatic acids that may be utilized as one of the components of the electrolyte include but are not limited to those acids which contain from about 1 to about 10 carbon atoms such as formic acid, acetic acid, propionic acid, n-butyric acid, isobutyric acid, n-valeric acid, trimethylacetic acid, caproic acid, oenanthylic acid, caprylic acid, pelargonic acid, capric acid, etc. Examples of suitable aromatic compounds that may be utilized as another of the components of the electrolyte include but are not limited to benzene, toluene, ortho-xylene, meta-xylene, para-xylene, ethylbenzene, pseudocumene, cumene, ortho-cymene, metacymene, para-cymene, chlorobenzene, bromobenzene, 1,2-dichlorobenzene, 1,2-dibromobenzene, 1,5,6-trichlorobenzene, aniline, ortho-toluidine, meta-toluidine, para-toluidine, 2,4,5-trimethylaniline, nitrotoluene, phenol, catechol, resorcinol, hydroquinone, ortho-cresol, meta-cresol, para-cresol, para-nitrophenol, anisole, ortho-methylanisole, meta-methylanisole, para-methylanisole, ortho-ethoxytoluene, meta - ethoxytoluene, para - ethoxytoluene, 2,4,5-trimethoxytoluene, 2-methoxyphenol, 2-ethoxyaniline, 2-ethoxyanisole, etc. Examples of suitable Group III–A halides that may be utilized as another of the components of the electrolyte include but are not limited to boron fluoride, boron chloride, aluminum chloride, aluminum bromide, gallium chloride, indium chloride, thallium chloride, etc. It is understood that the aforementioned lower aliphatic acids, aromatic compounds and Group III–A halides are only representative of the classes of compounds which comprise the novel electrolyte and the present invention is not necessarily limited thereto.

The method of depositing a high-melting impervious organic compound on a metal substrate according to the process of this invention may be effected in either a batch or continuous type operation. For example, when a batch type operation is employed, the electrochemical cell utilizes the metal substrate that is to be coated as the anode while the second electrode terminal is utilized as the cathode. The electrolyte comprising a lower aliphatic acid, an aromatic compound and a Group III–A halide is placed in the cell so that the positive and negative electrodes are submerged beneath the surface of the electrolyte. A direct current flow is emitted to the electrochemical cell and maintained by a differential of electrical potential between the first electrode and the second electrode for a predetermined period of time sufficient to deposit the high-melting, impervious organic coating upon the anodic metal substrate. The high-melting, impervious coating is found to be the oxacylated derivative of the lower aliphatic acid substituted on the rings of the condensation product of the aromatic compound employed in the electrolyte. Where superatmospheric pressures are to be employed in this electrolysis, the electrolyte is charged to the electrochemical cell as previously described and the ambient pressure is adjusted to a predetermined level by entry of an inert gas such as nitrogen. After a predetermined period of time the inert atmosphere is discharged (with cooling as required), allowing the electrochemical cell to return to atmospheric pressure at which time the anodic coated metallic substrate is removed.

It is also within the contemplation of this invention that a continuous type of operation may be employed to effect the electrocoating of the metallic substrate. When such a type of operation is employed, the electrolyte must be continually charged to the previously described electrochemical cell in order to maintain a proper level above the bottom of the electrodes. The anodic metal substrate must also be periodically removed from the operation at the point of desired thickness of the high-melting, impervious organic coating to prevent over-coating.

The following examples are given to illustrate the method of the present invention which, however, are not intended to limit the generally broad scope of the present invention.

EXAMPLE I

In this example of the process of the present invention, a standard water-cooled electrochemical cell was utilized having a platinum anode of the magnitude of 80 square centimeters and a platinum cathode of the magnitude of 2 square centimeters. The electrolyte added to the electrochemical cell was a solution of 78 grams of benzene in 270 grams of acetic acid containing 80 grams of boron fluoride. The initial electromotive force was found to be about 3.6 volts as standardized against mercurous chloride. After the eighth hour of electrolysis performed at 20° C., the electromotive force was again measured versus the same mercurous chloride standard and found to be 110 volts. At this time, electrolysis was terminated, the anodic platinum electrode was removed and discovered to be coated with a hard, black, impervious organic material that was found to be insoluble in most solvents such as cyclohexane, benzene, toluene, n-pentane, etc. A melting point determination showed the melting point of the hard, black, impervious organic material to be over 300° C. while a saponification number determination disclosed the coating to have an equivalent weight of 130 atomic mass units. Likewise, an infrared spectrum showed the hard, black, impervious organic coating to consist of 70% to 90% of the aromatic rings acetylated with cross-linking of the aryl groups. The structure was found to be in accordance with the disclosed structure:

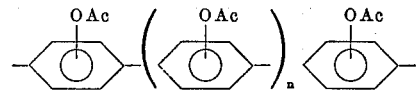

where Ac is the acetyl group and $n$ is a number greater than 1.

EXAMPLE II

To an electrochemical cell maintained at 50° C. with a platinum anode and platinum cathode is added a solution containing 92 grams of toluene in 300 grams of propionic acid containing 80 grams of boron fluoride. The initial electromotive force is standardized against mercurous chloride and found to be 3.4 volts. The electrolysis is maintained for 10 hours at which time the electrocoating is terminated and the final electromotive force is 110 volts as standardized against mercurous chloride. It is found upon termination of electrolysis that 0.3 faradays of current had passed through the electrochemical cell. The anodical platinum metal was again removed and found to contain the same hard, black, mostly insoluble, impervious organic material with a melting point over 300° C. and an equivalent weight between 140 and 150 atomic mass units. An infrared spectrum of the hard, black, mostly insoluble, impervious organic material showed the aromatic rings to be about 80% to 85% propionylated while evidence of cross-linkage of the aryl groups was also found. The structure of the coating was found to be that as disclosed in Example I, except for differences in the substituents.

EXAMPLE III

In this experiment an electrochemical cell is water-cooled and maintained at 25° C. while an inert gas, such as nitrogen, is bled into the cell in order to obtain and maintain thereat a pressure of 2 atmospheres. The electrochemical cell is equipped with the same platinum metal anode and platinum metal cathode. The electrolyte contained in the cell is a solution of 108 grams of anisole in 350 grams of acetic acid containing 80 grams of boron fluoride. The initial electromotive force is standardized against mercurous chloride and measured at 3.6 volts. After a 6-hour period of electrolysis, the nitrogen is discharged allowing the electrochemical cell to return to room pressure. The electromotive force is found to be about 95 volts upon termination of electrolysis. The anodical platinum is removed and found to again be coated with a hard, black, mostly insoluble, impervious organic material of an equivalent weight of about 160 atomic mass units and a melting point of over 300° C. An infrared spectrum of the deposit indicates the aromatic rings to be about 80% to 90% acetylated with cross-linkage between the aryl groups similar to that disclosed in Experiment 1.

EXAMPLE IV

In this experiment an electrochemical cell is utilized at atmospheric pressure and maintained at a constant 23° C. temperature by a waetrjacketed bath. The cell is again equipped with the requisite platinum metal anode, with the platinum metal cathode and with the standardized equipment to measure the electromotive force. The electrolyte that is placed into the cell is a solution of 108 grams of anisole in 350 grams of acetic acid containing 306 grams of gallium chloride. The electromotive force is allowed to increase to 110 volts during a two hour period at which time the electrolysis is terminated. The anodical platinum is found to be coated with a hard, black, mostly insoluble, impervious organic material. The material is analyzed, said analysis disclosing a melting point of 340° C. and an equivalent weight of 160 atomic mass units. Infrared spectrum discloses the atomic ring to be 80% to 90% acetylated with some evidence of cross-linkage between the aryl groupings as shown in Example I.

We claim as our invention:

1. In a method for electrochemically coating a metallic substrate utilized as the positive electrodes of an electrochemical cell in which a direct current flow of electrical energy is maintained throughout the electrolyte passing from the negative cathode to the positive anode, where a difference of electrical potential of the first electrode to that of the second electrode is provided to insure a direct current flow of electrical energy for a predetermined period of time sufficient to form a high-melting, impervious organic coating on said substrate, the improvement which consists in the utilization of an electrolyte comprising a lower aliphatic acid, an aromatic compound and a Group III–A halide.

2. The method of claim 1 further characterized in that the temperature of the electrochemical cell is maintained at about 0° to about 125° C. and at a pressure of about one atmosphere to about 5 atmospheres.

3. The method of claim 1 further characterized in that the duration of electrolysis is from about 0.1 hour to about 15 hours.

4. The method of claim 1 further characterized in that the lower aliphatic acid is acetic acid.

5. The method of claim 1 further characterized in that the lower aliphatic acid is propionic acid.

6. The method of claim 1 further characterized in that the aromatic compound is benzene.

7. The method of claim 1 further characterized in that the aromatic compound is toluene.

8. The method of claim 1 further characterized in that the aromatic compound is anisole.

9. The method of claim 1 further characterized in that the Group III–A halide is boron fluoride.

10. The method of claim 1 further characterized in that the Group III–A halide is gallium chloride.

References Cited
UNITED STATES PATENTS

| | | | |
|---|---|---|---|
| 3,417,003 | 12/1968 | Ross et al. | 204—181 |
| 3,697,398 | 10/1972 | Wessling et al. | 204—56 R |
| 3,720,589 | 3/1973 | Masunaga | 204—14 N |

THOMAS TUFARIELLO, Primary Examiner

U.S. Cl. X.R.

204—56 R